INVENTORS
WOUTER SMEULERS
PAULUS J.M. HOVENS
JAN A.C. KORVER
BY
AGENT

INVENTORS
WOUTER SMEULERS
PAULUS J.M. HOVENS
JAN A.C. KORVER
BY
Frank R. Trifari
AGENT

United States Patent Office 3,712,999
Patented Jan. 23, 1973

3,712,999

CONTROL-CIRCUIT FOR A DEFLECTION CIRCUIT OF A DISPLAY ARRANGEMENT

Wouter Smeulers, Paulus Joseph Maria Hovens, and Jan Abraham Cornelis Korver, Emmasingel, Eindhoven, Netherlands, assignors to U.S. Philips Corporation, New York, N.Y.

Filed Nov. 2, 1970, Ser. No. 86,146
Claims priority, application Netherlands, Nov. 4, 1969, 6916661
Int. Cl. H01j 29/70
U.S. Cl. 315—19 12 Claims

ABSTRACT OF THE DISCLOSURE

A TV deflection system that includes a control circuit for producing a voltage which is the combination of a sawtooth voltage, a voltage varying approximately at the third power, and a parabolic voltage. The arrangement comprises a long-tailed pair circuit connected as a multiplier circuit to which are applied a parabolic voltage and a voltage that is the sum of a DC voltage and a sawtooth voltage. The parabolic voltage and the sawtooth voltage are of the same frequency. In order to reverse the polarity of the parabolic component of the output signal, a second long-tailed pair circuit is added in which a parabolic voltage is multiplied by a direct voltage. The output voltages of the long-tailed pair circuits are added. The system lends itself to fabrication as an integrated circuit.

The present invention relates to a control-circuit for a deflection circuit in a display arrangement for producing a voltage which is the combination of a sawtooth voltage and a voltage varying approximately in the third power, as the case may be, combined with a parabolic voltage.

In U.S. Pat. No. 3,426,243 a circuit arrangement is described for the production of a sawtooth current through the frame deflection coil of a display arrangement, to which a parabolic component and a so-called S-shaped component have to be added. Since the frequency of the frame deflection is comparatively low, the frame deflection coil behaves like an ohmic resistance so that, in principle, a parabolic component normally would not be required. If, however, the frame output circuit includes inductances, it is required, as is known, for such a component to be available. This applies to the case in which a tube is used as a final stage, in which a matching transformer is employed. This may also be the case in output stages equipped with transistors, even if so-called single-ended push-pull amplifiers are employed, the output impedance of which is sufficiently low for dispensing with a transformer. Reasons thereof are set out, for example, in U.S. Pat. No. 3,434,004 and application No. 18,135, filed on Mar. 10, 1970, in which it is furthermore stated that it is often desirable for the parabolic component to be adjustable at will with respect to its amplitude.

The S-component is required because of the fact that the screen of the display tube is substantially flat. As is stated in said U.S. patent the desired signal to be applied to the output amplifier by the control circuit may be represented as a function of time by the following relation:

$$v=\alpha t+\beta t^2-\gamma t^3 \quad (1)$$

wherein the linear term and the square term represent the sawtooth and parabolic components. The third-power term has to be subtracted from the linear term and thus represents the S-component.

According to the U.S. patent, referred to above, such a signal is produced. This requires a circuit arrangement comprising a large number of passive components, e.g. capacitors and coils. In the modern state of technology using more integrated circuits it becomes necessary to use fewer passive components, with the exception of low-value resistors which can be readily integrated in a semiconductor body. The number of active elements, such as transistors, does not give rise to trouble since the cost price of an integrated circuit hardly relates to the number. The invention therefore has for its object to produce a voltage of the waveform described by means of a circuit arrangement which does not comprise capacitors or coils and is characterized in that the arrangement comprises a multiplying circuit to which are applied a parabolic voltage and the sum of a direct voltage and a sawtooth voltage, the sawtooth voltage and the parabolic voltage having the same frequencies.

It has been proposed to allow the parabolic component to change its polarity, the term "polarity" being understood to mean herein the direction of the extreme of the parabola at the centre with respect to the origin and the end of the frame period. In order to have a possibility of adjusting at will the amplitude and/or the polarity of the parabolic component, a further circuit arrangement embodying the invention is characterized in that the voltage produced is the difference between the sawtooth voltage and the voltage varying approximately at the third power. In this embodiment the arrangement comprises a second multiplying circuit to which are applied a parabolic voltage having the same polarity as the parabolic voltage applied to the first multiplying circuit and a direct voltage. An output voltage of the first multiplying circuit (including a parabolic component of the same polarity as the parabolic voltage applied to the first multiplying circuit) and an output voltage of the second multiplying circuit (including a parabolic component of the polarity opposite that of the parabolic voltage applied to the second multiplying circuit) are applied to an adding circuit, means being provided for adjusting the amplitude of the parabolic voltages applied to either of the two multiplying circuits.

The realization of the circuit in accordance with the invention can be such that it is characterized in that each multiplying circuit is equipped with two emitter-coupled transistors and a third transistor, the collector of which is connected to the junction of the emitters of said two transistors, whereas its emitter is connected to ground via a resistor.

The invention is based on the recognition of the fact that the present arrangement can readily ensure that the vertical dimension of the displayed image remains constant in spite of variations in the beam current in the display tube. This requires a measuring voltage which is a function of the variations of the high voltage. This widens the range of uses of the arrangement embodying the invention, which is characterized in that the measuring voltage is applied to the base of one of the emitter-coupled transistors via a resistor.

It should be noted that the circuit arrangement according to the invention forms part of an integrated circuit which may comprise further parts, for example, the frame oscillator and a control circuit. The frame oscillator provides a signal to the arrangement embodying the invention, whilst the control circuit provides a correct excitation of the frame output amplifier. In this way a great number of circuits can be assembled in a particularly compact unit, the cost price of which is considerably lower than that of known conventional structures. Other known advantages are the small dimensions of the assembly, the reliability in operation and the minimum change with time and/or temperature, as well as the very slight variation of its properties from specimen to specimen. A further advantage of the circuit according to the invention will become evident, that is to say, the simplicity of the linearity control.

By way of example, the invention will be described more fully with reference to the accompanying drawing in which, FIG. 1 shows an embodiment in which the two polarities of the parabolic components can be obtained.

Figure 1:
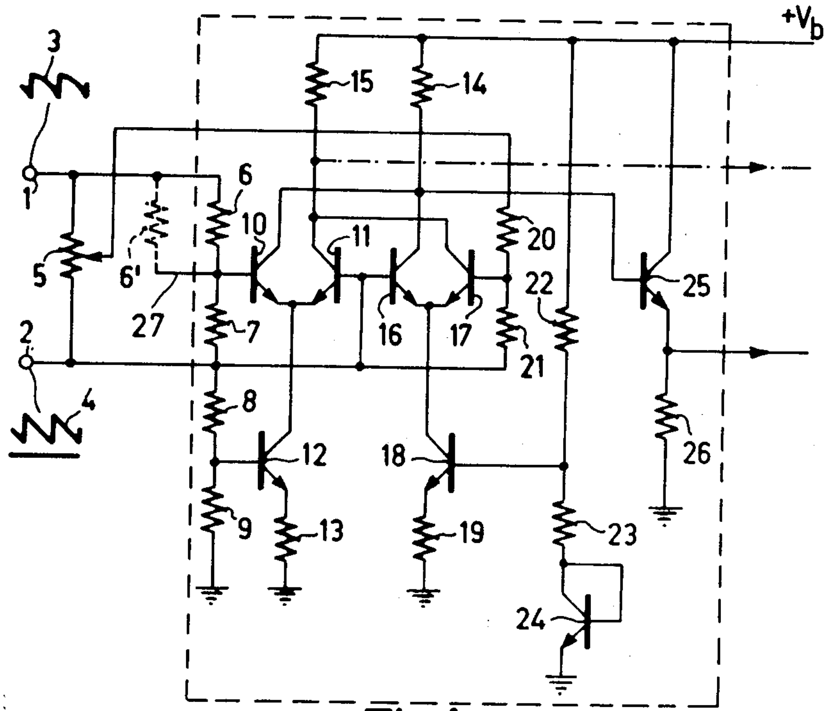

Referring to FIG. 1, reference numeral 1 designates a first input terminal and reference numeral 2 a second input terminal, to which two voltages originating from a frame oscillator (not shown in FIG. 1) are applied. The voltage 3 at terminal 1 may have the waveform shown in FIG. 1 and the voltage at terminal 2 is designated by waveform 4. The voltage 3 is the combination of a parabolic voltage and a sawtooth voltage, whereas the voltage 4 is the combination of a direct voltage and a purely sawtooth-like voltage; during the frame sweep the voltages 3 and 4 mainly decrease. The frame oscillator has to supply these two voltages. Oscillators are known which are indeed capable of producing such voltages, for example, the so-called modified transitron with a Miller integrator disclosed in the book "Televisie" by F. Kerkhof and W. Werner, Third Edition, Fig. 9.4–23, pages 319 and ff. The capacitor of the Miller integrator, i.e. the capacitor connected between the output and the input of the amplifying element, is split up into two series-connected capacitors, the junction of which is connected to ground through a resistor. The substantially linear saw-tooth voltage appears at this junction and at the output electrode of the amplifying element a voltage appears which is the combination of this sawtooth voltage and of a parabolic voltage. The sawtooth voltage decreases with time during the sweep, whereas the parabolic voltage is such that its amplitude reaches a maximum in the positive sense at the centre of the sweep. The first-mentioned voltage can therefore be applied to terminal 2 and the second voltage to terminal 1. The sources supplying the voltages 3 and 4 to the terminals 1 and 2 are low-ohmic and may be formed by emitter followers.

The terminals 1 and 2 have a potentiometer 5 connected between them and are connected to each other by means of two resistors 6 and 7 respectively, the resistor 6 having a considerably higher value than resistor 7. Terminal 2 is connected to earth via two resistors 8 and 9. The voltage at the junction of resistors 6 and 7 controls the base of a transistor 10, the voltage at the junction of resistors 7 and 8 controls the base of a transistor 11 and that at the junction of resistors 8 and 9 controls the base of a transistor 12. Transistors 10, 11 and 12, all of which are of the npn-type, form a so-called long-tailed pair circuit, which means that the emitters of transistors 10 and 11 are connected to each other and to the collector of transistor 12, whereas a resistor 13 is connected between the emitter of transistor 12 and ground. The collector resistors 14 and 15 of transistors 10 and 11 respectively have equal values and are connected to a positive direct voltage source $V_b$ (not shown).

The resistors 8 and 9 are traversed by a direct current from terminal 2 so that transistor 12 receives the required base bias voltage, which is lower than that of transistors 10 and 11. The resistors 6, 7, 8 and 9 are traversed by an alternating current from input terminal 1 and the resistors 8 and 9 are traversed by an alternating current from input terminal 2. Because the source connected to terminal 2 is low-ohmic, it constitutes, in fact, a short-circuit for the voltage at terminal 1, whereby the control-voltage of transistor 12 is a combination of a direct voltage and a sawtooth voltage. It is known that the transistor 12 and the emitter resistor 13 operate as a current source and the sum of the emitter currents $i_1$ and $i_2$ of transistors 10 and 11 respectively is equal to the collector current $i$ of transistor 12:

$$i_1=i/2+\Delta i$$
$$i_2=i/2-\Delta i$$

wherein the collector current $i$ is the combination of a sawtooth current and a direct current.

The current $\Delta i$ is produced by the difference between the control-voltages of transistors 10 and 11. If it is supposed that the sawtooth voltage 4 is equal to the sawtooth voltage which provides in conjunction with the parabolic voltage the waveform 3, only this parabolic voltage appears across the resistors 6 and 7. This applies to the case in which the frame oscillator is the aforesaid oscillator. Since resistor 7 is connected between the bases of transistors 10 and 11, this difference voltage is parabolic. Because the relations given above can represent the operation of such an arrangement with satisfactory approximation only when the difference voltage is low, that is to say low relative to the base-emitter threshold voltage of the transistors, resistor 6 should have a considerably higher value than resistor 7. In a practical embodiment the value of resistor 6 is about 15.6K ohms and that of resistor 7 about 400 ohms, so that with a voltage difference of 1 v. peak-to-peak between terminals 1 and 2 the peak-to-peak amplitude of the voltage across resistor 7 is about 20 mv.

As is known, a long-tailed pair circuit operates under these conditions as a multiplying circuit. The current $\Delta i$ produced by the difference control-voltage between the bases of transistors 10 and 11 through the emitter of transistor 10 at a given instant is proportional to the current $i$ traversing at the same instant the transistor 12 and to the voltage across resistor 7. As a functional of time the current $\Delta i$ is therefore the product of the functions of the current $i$ and the difference control-voltage across resistor 7. The current $i$ may be represented algebraically by the function $-at+b$, which is a decreasing sawtooth current superimposed on a direct current. This expression relates to the frame sweep, the origin of the times being the centre of said sweep. In a smilar manner the difference control-voltage may be represented as a function of time by $$-ct^2+d$$

The current $i$ then is:

$$i=(-at+b)(-ct^2+d)$$

so that the emitter current and approximately the collector current of transistor 10 is:

$$i_1=\tfrac{1}{2}(-at+b)+(-at+b)(-ct^2+d)$$
$$=b(\tfrac{1}{2}+d)-a(\tfrac{1}{2}+d)t-bct^2+act^3$$

The circuit arrangement shown in FIG. 1 comprises a second long-tailed pair circuit formed by the transistors 16, 17 and 18, the emitters of transistors 16 and 17 being connected to each other and to the collector of transistor 18. The emitter of transistor 18 is connected via a resistor 19 to ground. The base of transistor 16 is connected to that of transistor 11. Between the tapping of potentiometer 5 and said base are connected resistors 20 and 21, whose junction is connected to the base of transistor 17. A resistor 22 is connected between the base of transistor 18 and the voltage source $V_b$. The series combination of a resistor 23 and a transistor 24 is connected between said base and ground, the collector and the base of transistor 24 being connected to each other. The collector of transistor 16 is connected to that of transistor 10 and the collector of transistor 17 to that of transistor 11. The output voltage of the arrangement is derived from the junction of the collectors of transistors 10 and 16 and controls the emitter-follower transistor 25. This output voltage is available as a low ohmic voltage source at the emitter of transistor 25, i.e.

across the resistor 26 connected between ground and this emitter.

The second long-tailed pair circuit operates in the same manner as the first, the difference being, however, that transistor 18 is driven only by a direct voltage. Moreover, the difference control-voltages of transistors 16 and 17 and those of transistors 10 and 11 are opposite to each other. The emitter current $i_1'$ and approximately the collector current of transistor 16 may therefore be represented by:

$$i_1'=i'/2+\Delta i'$$

wherein $i'$ is the collector current of transistor 18:

$$i_1'=\tfrac{1}{2}b'+b'(c't^2-d')$$
$$=b'(\tfrac{1}{2}-d')+b'c't^2$$

With these notations the current traversing the common load resistor 14, which operates as an adding stage, and hence also the output voltage at the emitter of transistor 25 (with the exception of a proportionality constant and with opposite polarity relative to the current) can be expressed as follows:

$$v=-b(\tfrac{1}{2}+d)-b'(\tfrac{1}{2}-d')+a(\tfrac{1}{2}+d)t+(bc-b'c')t^2-act^3 \quad (2)$$

This is the desired form (1) but for the presence of a direct voltage component:

$$-b(\tfrac{1}{2}+d)-b'(\tfrac{1}{2}-d')$$

The foregoing applies to a given position of the tapping of potentiometer 5. For the sake of symmetry the resistor 21 has a value equal to that of resistor 7, whereas resistor 20 has a higher value than resistor 21, but a lower value than resistor 6. In said practical embodiment the value of resistor 20 is about 6.1K ohms. When the tapping of potentiometer 5 is connected to terminal 1, the difference control-voltage of the second long-tailed pair circuit is higher than that of the first, so that the term $b'c'$ in the square term in Equation 2 is higher than the term $bc$ and hence the parabolic component has positive polarity. When the tapping of potentiometer 5 is connected to terminal 2, the second long-tailed pair circuit does not receive a difference control-voltage so that $b'c'$=zero. In this case the parabolic comonent has negative polarity. In a given intermediate position of the tapping of potentiometer 5 this parabolic component becomes zero, i.e. $bc=b'c'$. Because the value of resistor 20 is approximately half the value of resistor 6, this is approximately at the centre of potentiometer 5. The quantity and the polarity of the parabolic voltage in the output voltage is herefore adjustable at will by means of potentiometer 5; the latter thus constituting the linearity control.

All components of the arrangement shown in FIG. 1 may form part of an integrated circuit, of course with the exception of potentiometer 5. In FIG. 1 the components integrated in the semiconductor body are indicated within the part framed within the broken lines. If it is also desired to adjust the S-component, the term $c$ of Formula 2 may be rendered variable. For this purpose a resistor 6' may be connected in parallel with resistor 6. This requires that a connection 27 be formed in the semiconductor body at the junction of resistors 6 and 7. The adjustment of the S-correction and the control of linearity are in this case dependent one upon the other, but since the extent of S-correction is determined only by the deflection angle of the display tube, resistor 6 and, as the case may be, resistor 6' may have a fixed value.

The direct-voltage components introduced by transistors 12 and 18 are required to provide parabolic components in the collector currents to transistors 10 and 16 (the term $b$ and $b'$ in Equation 2). In principle the values of these direct-voltage components are not subjected to any requirements because other means are available for adjusting the parabolic component. However, it is desirable for these direct currents to be approximately equal so that the temperatures of transistors 10, 11, 12 and of transistors 16, 17, 18 are as equal as possible, the variation of the parabolic component in the output signal being thus minimized. In said practical embodiment the collector currents of transistors 12 and 18 are both adjusted to a value of about 0.8 ma. This is carried out by selecting the values of resistors 13, 19, 22 and 23 respectively. This has to be considered as a refinement because transistors 10, 11, 16 and 17 already have approximately equal temperatures since they form part of the same semiconductor body.

By means of the transistor 24, connected as a diode, further stabilisation is achieved. Because transistors 18 and 24 are integrated in the same semiconductor body, they have approximately the same temperature so that their base-emitter threshold voltages $v_{be}$ are subjected to the same variations. If, for example, the voltage $v_{be}$ of transistor 24 rises, the voltage at the junction of resistors 22 and 23 and hence at the base of transistor 18 rises by the same amount since the current passing through said resistors has hardly changed. However, because the voltage $v_{be}$ of transistor 18 has increased by approximately the same amount, the adjustment of transistor 18 remains practically unchanged. This results in a stabilisation with regard to temperature fluctuation. The first long-tailed pair circuit does not require such a stabilisation because the sawtooth control-voltage of transistor 12 is so high that any variations of the $v_{be}$ of the transistor with respect thereto are negligible. The voltage divider formed by resistors 7, 8 and 9 ensures that transitors 10 and 11 are invariably controlled by a higher alternating voltage than transistor 12 so that the latter can never be saturated in spite of said high amplitude of its control-voltage. The collectors of transistors 11 and 17 are connected to each other and through a resistor 15, equal to resistor 14, to the direct-voltage source $V_b$. In this way the collector dissipations of transistors 10, 11, 16 and 17 are substantially equal to each other so that an additional temperature stabilisation is obtained.

If, in contrast to the foregoing, a parabolic component of only one polarity would be sufficient, the arrangement would need only one long-tailed pair circuit. In this case the elements 5 and 16 to 24 of FIG. 1 can be dispensed with. In order to provide a possibility of adjusting the amplitude of the parabolic component, the direct-current component introduced by transistor 12 has to be adjustable. This may be achieved, for example, by rendering resistor 13 variable.

If the output voltage of the arrangement is derived from the junction of the collectors of transistors 11 and 17, as is indicated by a broken line in FIG. 1, instead of being derived from the junction of the collectors of transistors 10 and 16, the currents $i_1=i_{/2}-\Delta i$ and $i'_2=i_{/2}-\Delta i'$ have to be added to each other.

$$i_2=\tfrac{1}{2}(-at+b)-(-at+b)(-ct^2+d)$$
$$=b(\tfrac{1}{2}-d)-a(\tfrac{1}{2}-d)t+bct^2-act^3$$

and $$i'_2=\tfrac{1}{2}b'-b'(c't^2-d')$$
$$=b'(\tfrac{1}{2}+d')-b'c't^2$$

so that the output voltage equals:

$$v=-b(\tfrac{1}{2}-d)-b'(\tfrac{1}{2}+d')+a(\tfrac{1}{2}-d)t+(b'c'-bc)t^2+act^3 \quad (3)$$

If potentiometer 5 is adjusted so that $bc=b'c'$, the parabolic component disappears. There remains, but for a direct voltage component:

$$v=\alpha t+\gamma t^3$$

The third power term is added to the linear term. Such a voltage waveform may be termed anti-S-shaped. The deflection signal is then higher at the beginning and at the end of the stroke than in the case of a sawtooth waveform. Such a signal may be desired as is disclosed in U.S. patent application Ser. No. 40,873, filed on May 27, 1970, in which a signal has the line frequency and is subjected to frame-freqeuncy modulation.

Turning again to the arrangement of FIG. 1, the following improvement may be applied. It is known that the amplitude of the deflection may be kept substantially constant, when the high voltage, i.e. the voltage at the output anode of the display tube, varies by a given percentage, for example, due to variations of the beam current, whilst the deflection current varies with half said percentage. This is true for not too high variations. However, since the direct-voltage source $V_b$, which also feeds the frame oscillator, is usually stabilized, the output voltage of the arrangement of FIG. 1 is substantially constant so that the deflection current is also substantially constant and the vertical dimension of the displayed image increases with a decrease in high voltage (which comes down at higher brightness).

Figure 2:
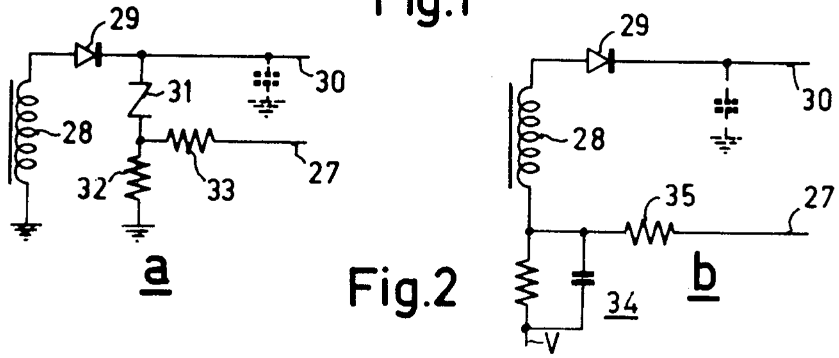
FIG. 2 shows two embodiments of circuit arrangements in which a direct voltage depending upon the beam current is applied to the arrangement shown in FIG. 1.

FIG. 2*a* shows a circuit arrangement which compensates the effect described above. The winding 28 represents a winding of a transformer not otherwise shown, across which line fly-back pulses are stepped up. The rectifier 29 rectifies the incoming pulses so that the high voltage is produced across the conductor 30. Between conductor 30 and ground are connected in series a voltage-dependent resistor 31 and a linear resistor 32 of low value, so that the high voltage can only be subject to small variations. Between the junction of resistors 31 and 32 and the connection 27 of FIG. 1 is connected a resistor 33 of high value. Resistors 32 and 33 may be chosen so that the voltage variation across resistor 32, which is substantially equal to the high-voltage variation, results in such a voltage variation at the connection 27 that the output voltage at the emitter of transistor 25 varies by a percentage equal to half the percentage of the variation of the high voltage. Then the parabolic component slightly changes, it is true, but this change is negligible since the variation in output voltage amounts to only a few percent.

FIG. 2*b* shows a further embodiment. Between the high voltage winding 28 and a direct-voltage source V (not shown) is connected the parallel combination 34 of a resistor and a smoothing capacitor, across which a voltage is produced which is proportional to the beam current and which may be used, for example, for preventing the beam current from exceeding a given value. A resistor 35 is connected between the junction of winding 28 and parallel combination 34 and the connection 27. The voltage V is equal to the average value of the voltage at the connection 27 and resistor 35 is chosen so that the output voltage of the arrangement of FIG. 1 varies with half the percentage. These two embodiments permit, at a variation of the high voltage, of varying simultaneously the frame deflection current without a variation of the amplitude of the voltage supplied by the frame oscillator.

Figure 3:
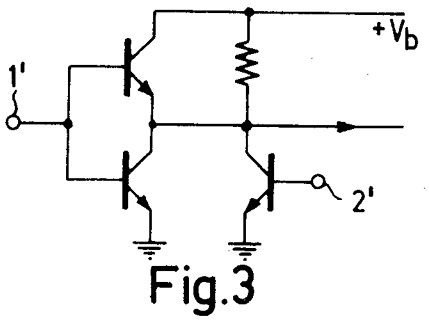
FIG. 3 shows a simplified form of the arrangement in which a single polarity of the parabolic component can be obtained.

As a matter of course, other known multiplying circuits may be obtained without affecting the principle of this invention. Such a circuit arrangement is shown in a simplified form in FIG. 3 for the case in which a parabolic component of only a single polarity is required so that this arrangement has the same function as the first long-tailed pair circuit of FIG. 1. The terminals 1' and 2' of FIG. 3 receive the sum of a direct voltage and a sawtooth voltage and a parabolic voltage, respectively. Alternatively tube-equipped multiplying circuits may be used.

Figure 4:
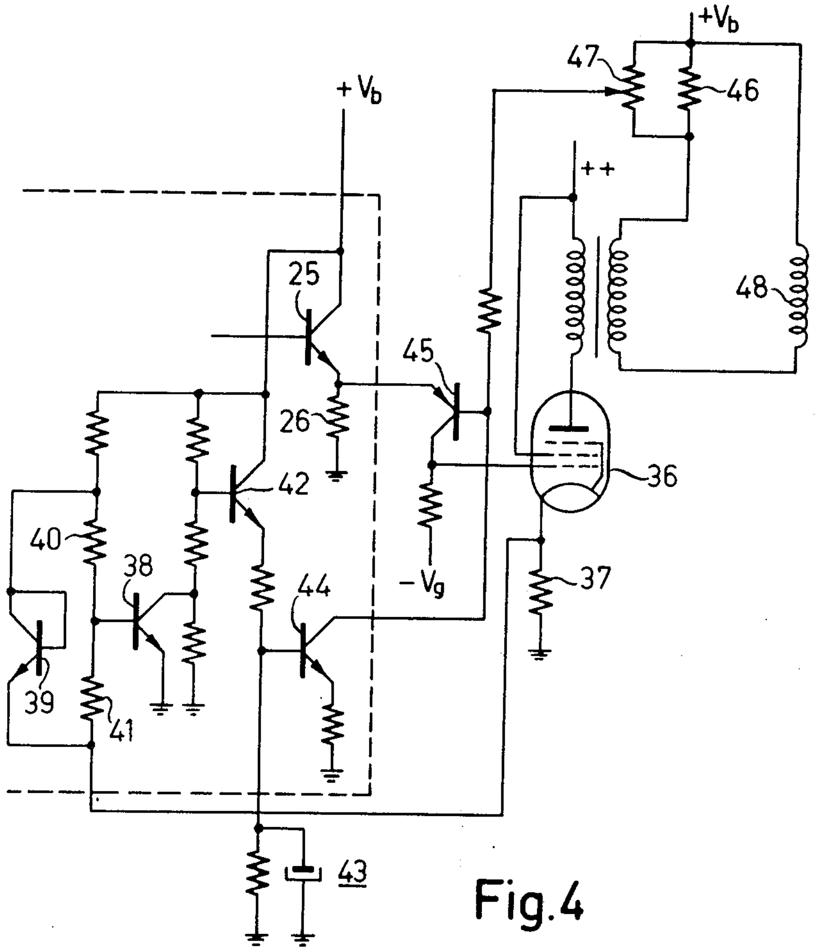
FIG. 4 shows a control circuit processing the output signal of the arrangement of FIG. 1.

The output signal of the arrangement of FIG. 1 comprises a direct-voltage component, which is undesirable and which cannot be eliminated without the need for further means, since capacitors of high value cannot be integrated in a semiconductor body. It is furthermore desirable for the frame output amplifier to be controlled so that the direct current traversing said amplifier is adjusted to a minimum value in order to avoid unwanted dissipation and in order to minimize the premagnetisation in an output transformer, if any, without the risk of this current becoming equal to zero, for example due to variations. For these reasons the semiconductor body may be provided with a control-circuit by which this current is kept at a substantially constant low value. FIG. 4 shows an embodiment thereof, in which the output amplifier is formed by pentode 36.

Between the cathode of pentode 36 and ground is connected a measuring resistor 37 of, for example, 10 ohms, which is traversed by a current containing inter alia a sawtooth component and a parabolic component owing to the control-signal applied to tube 36. The voltage at the cathode during the stroke is of the waveform shown in FIG. 5*a* and is supplied to the base of a transistor 38. If, for example, the average cathode current of pentode 36 is about 50 ma., the average cathode voltage thereof is about 0.5 v. A transistor 39, connected as a diode, is connected via a resistor between the source $V_b$ and the cathode. The direct voltage across transistor 39 is about 0.7 v. In parallel with transistor 39 is connected a series-combination of two resistors 40 and 41, the values of which are about 880 ohms and 2.3 K ohms respectively, so that a voltage of about 1 v. would be produced at the junction thereof. However, this junction is connected to the base of transistor 38, whose emitter is connected to ground and whose collector resistor has a high value. Transistor 38 is therefore heavily saturated but for the case in which the alternating voltage at its base drops below its base-emitter threshold voltage, in which case it is cut off. At the collector is thus produced the pulse illustrated by a solid line in FIG. 5*b*, the peak value of which is determined by the resistors at the collector of transistor 38. The pulse is applied via a transistor 42 to the parallel combination 43 of a large resistor and a capacitor of high value. A direct voltage is produced across the latter which is the direct-voltage component of the pulse signal.

Figure 5:
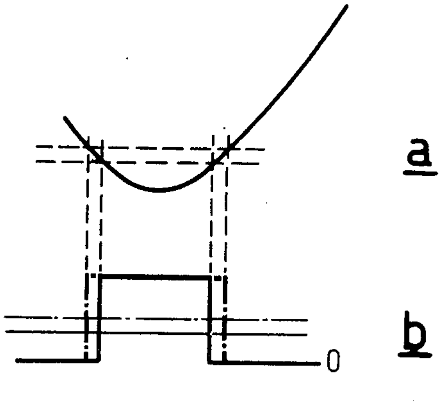
FIG. 5 shows two waveforms of voltages appearing in the arrangement of FIG. 1.

If the cathode current of pentode 36 tends to increase, the minimum value of this current also increases so that the duration of the pulse of FIG. 5*b* decreases, the direct voltage across the parallel combination 43 decreasing as a result thereof. This direct voltage is amplified by transistors 44 and 45 so that the collector voltage of transistor 45 also decreases. This collector is connected to the grid of pentode 36 so that the cathode current decreases. In this way the desired stabilization is achieved independently of the signal amplitude. The collector resistor of transistor 45 is connected to a negative direct-voltage source $-V_g$. Therefore, the range of variation of the grid voltage is sufficiently large. Moreover, transistor 45 is of the pnp-type which requires a negative voltage source. The output voltage of the arrangement shown in FIG. 1, which becomes available at the emitter of transistor 25, is applied to the emitter of transistor 45. This is possible because the output impedance of transistor 25 and the output impedance of transistor 45 are both low. In this way the output voltage of the arrangement of FIG. 1, amplified by transistor 45 and represented by Equation 2 is applied to the grid of pentode 36 without the phase of this voltage being shifted over 180°. The control-voltage of pentode 36 therefore has the desired polarity.

The parallel combination of a resistor 46 of low value, for example, 5 ohms, and of a potentiometer 47 is connected in series with the frame deflection coil 48. The collector resistor of transistor 44 is connected between the tapping of potentiometer 47 and the junction of the collector of transistor 44 and of the base of transistor 45. Thus an adjustable negative A.C. feedback is employed. The potentiometer 47 is the amplitude-control. For a given position of the tapping the amplitude of the output signal supplied by the arrangement of FIG. 4 is constant. Because both the amplitude and the minimum value of the signal are stabilized, it is ensured that the average cathode current of pentode 36 remains unchanged.

What is claimed is:

1. A control circuit for a cathode ray tube display system, said circuit comprising a first multiplier circuit having a first input means for receiving a repetitive parabolic signal of a selected polarity, a second input means for receiving a sum signal comprising a direct current signal and a repetitive sawtooth signal having the same repetitive frequency as said parabolic signal, and a first output means for providing an output signal comprising a sawtooth component and an approximately third power varying component.

2. A circuit as claimed in claim 1 wherein said first multiplier comprises a second output means for providing a parabolic signal, and further comprising a second multiplier circuit having a pair of input means for receiving a parabolic signal of said selected polarity and a direct current signal respectively, and an adder having a pair of input means coupled to said second output means and said second multiplier respectively.

3. A circuit as claimed in claim 2 further comprising means for varying the amplitude of said parabolic signal applied to said second multiplier.

4. A circuit as claimed in claim 1 further comprising means for varying the amplitude of said parabolic signal applied to said first multiplier.

5. A circuit as claimed in claim 2 wherein said output signal comprises the difference between said sawtooth and said third power component signals, said signal from said second output means being of said selected polarity, and said second multiplier providing a signal of a polarity opposite with respect to said selected polarity.

6. A circuit as claimed in claim 2 wherein said output signal comprises the sum of said sawtooth and said third power component signals, said signal from said second output means having a polarity opposite from said selected polarity, and said second multiplier providing a signal of said selected polarity.

7. A circuit as claimed in claim 2 wherein each of said multipliers comprises first, second, and third transistors each having emitter, base, and collector electrodes, said first and second transistors having their emitters coupled together, said third transistor collector being coupled to said coupled emitters; and a resistor coupled between said third transistor emitter and ground.

8. A circuit as claimed in claim 7 wherein said parabolic signals are applied to the bases of said emitter coupled transistors, said parabolic signals having a low amplitude with respect to the base-emitter threshold of said transistors.

9. A circuit as claimed in claim 7 further comprising means for establishing equal collector currents in said first and second multipliers and third transistors.

10. A circuit as claimed in claim 19 wherein said adder comprises a resistor coupled to one of said emitter coupled transistors of each said multipliers.

11. A circuit as claimed in claim 7 further comprising means for measuring the final anode voltage of said tube and a resistor coupled between said measuring means and the base of one of said emitter coupled transistor.

12. A circuit as claimed in claim 1 further comprising means for applying said output signal to a frame output stage of said display system, a regulating circuit having a limiter means for eliminating a pulsatory signal from said output signal, means for determining the average value of this pulsatory signal, and further means for combining said average value with an alternating current negative feedback voltage derived from the output circuit of the said frame output stage.

References Cited

UNITED STATES PATENTS 3,426,243 2/1969 Smeulers et al. ..... 315—276 D

FOREIGN PATENTS 6,801,780 8/1968 Netherlands ........ 315—13 C

CARL D. QUARFORTH, Primary Examiner
H. E. BEHREND, Assistant Examiner

U.S. Cl. X.R.

315—13 C, 27 GD